United States Patent [19]
Griffin et al.

[11] Patent Number: 5,422,809
[45] Date of Patent: Jun. 6, 1995

[54] METHOD AND APPARATUS FOR PROVIDING TRAVEL DESTINATION INFORMATION AND MAKING TRAVEL RESERVATIONS

[75] Inventors: Gene R. Griffin, Crofton; Sheryl K. Stoll, Severn; Ralph S. LaBarge, Gambrills, all of Md.; Martin J. Seltzer, Oyster Bay, N.Y.

[73] Assignee: Touch Screen Media, Inc., Oyster Bay, N.Y.

[21] Appl. No.: 111,605

[22] Filed: Aug. 25, 1993

[51] Int. Cl.⁶ .......................................... G06F 153/00
[52] U.S. Cl. .................................................... 364/407
[58] Field of Search ...................... 364/407, 408, 410

[56] References Cited
U.S. PATENT DOCUMENTS

| | | | |
|---|---|---|---|
| 4,449,186 | 5/1984 | Kelly et al. | 364/407 |
| 4,490,810 | 12/1984 | Hon | 364/410 |
| 4,922,439 | 5/1990 | Greenblatt | 364/407 |
| 5,235,509 | 8/1993 | Mueller et al. | 364/405 |
| 5,235,680 | 8/1993 | Bijnagte | 395/161 |
| 5,274,758 | 12/1993 | Beitel et al. | 395/154 |
| 5,309,355 | 5/1994 | Lockwood | 364/407 |

OTHER PUBLICATIONS

Free, "Through the Electronic Looking Glass into Living Pictures", Popular Science, Aug. 1981, pp. 68–70.

Primary Examiner—Donald E. McElheny, Jr.
Attorney, Agent, or Firm—Jeffrey D. Mills

[57] ABSTRACT

Apparatus and Method for providing travel destination information and making travel destinations which includes an information storage and retrieval system for storing, referencing and retrieving various travel destinations from a database. A querying device queries the user for input used to define the field for the travel destination desired, while a display device displays information associated with a selected travel destination. An accessing device is provided for making travel reservations concerning a selected travel destination. The apparatus and method optionally includes a reproducing device for printing information concerning travel destinations or reservations, a valuable media accepting device for accepting payment associated with travel reservations, or an accounting indicator device for accumulating statistical information on selected travel destinations.

31 Claims, 9 Drawing Sheets

TravelVision Kiosk

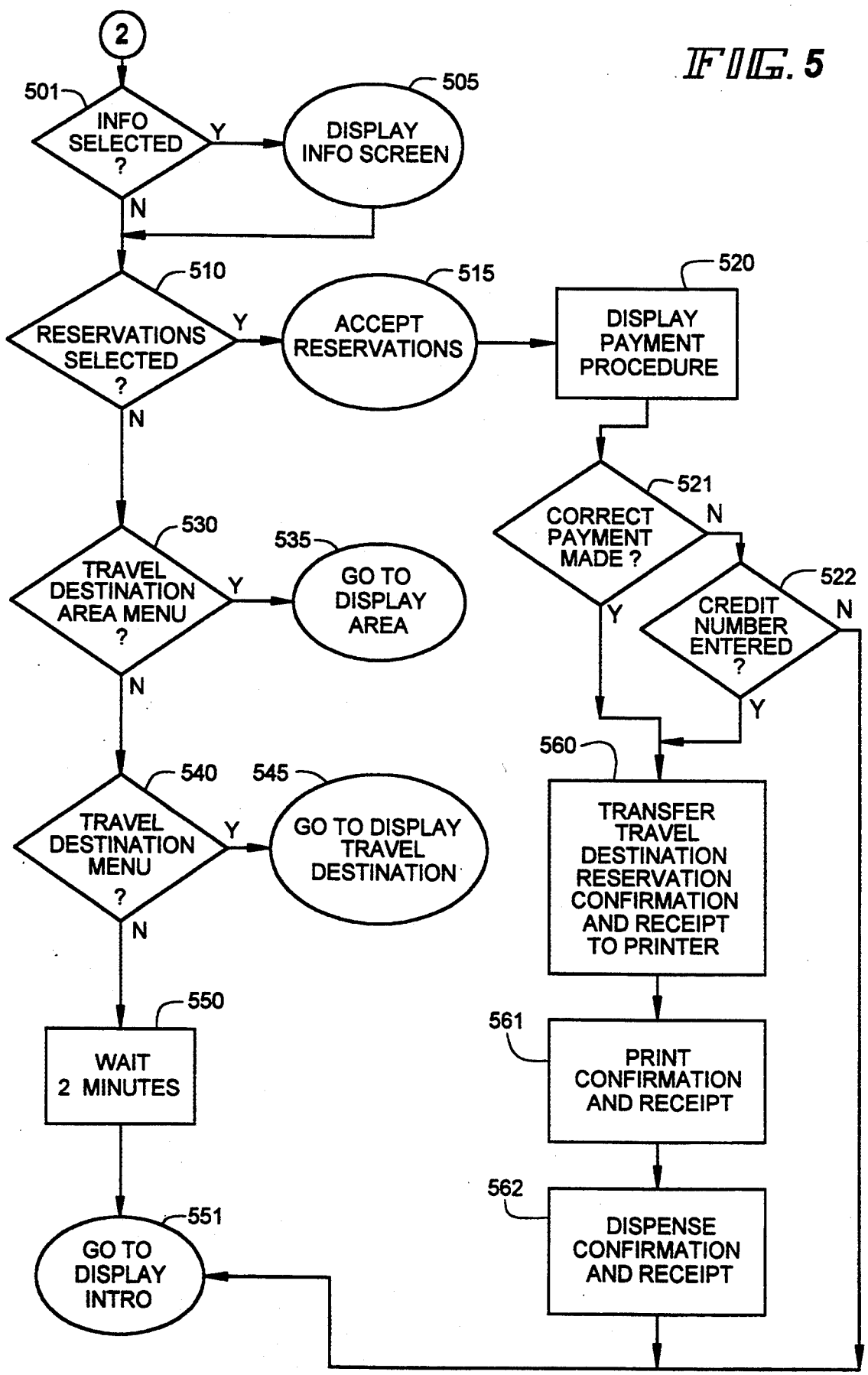

METHOD AND APPARATUS FOR PROVIDING TRAVEL DESTINATION INFORMATION AND MAKING TRAVEL RESERVATIONS

BACKGROUND OF THE INVENTION

1. Field Of The Invention

The present invention relates to the service of providing travel destination information in general, and in particular to a method and apparatus for providing travel destination information and making travel reservations.

2. State Of The Prior Art

Currently, information concerning travel destinations is typically obtained in various ways, through brochures, travelogues, videotapes, and other media which an interested person can obtain and review. If after reviewing the information one desires to make reservations to travel to a particular place, usually a separate effort must be made, such as placing a call to a travel agency, or to the resort itself, to make reservations. The Travelvision ® system allows a user to interactively "tour" any number of travel destinations around the world and obtain information regarding travel and leisure offerings at a particular destination using a personal computer. If a user decides to make travel reservations after reviewing one or more travel destinations on a Travelvision ® system, reservations and payment can be made on-site using the system.

Devices that employ computers for responding to choices made by the user, such as information kiosks, information display systems, and on-site systems that dispense products, are known in the art, as exemplified for instance, by U.S. Pat. No. 5,056,029 entitled METHOD AND APPARATUS FOR MANUFACTURING AND VENDING SOCIAL EXPRESSION CARDS, U.S. Pat. No. 4,817,043 entitled INFORMATION KIOSK and U.S. Pat. No. 4,920,514 entitled OPERATIONAL INFORMATION DISPLAY SYSTEM. Recent articles in newspapers and magazines have further touted the advent of information kiosks, describing systems which enable a user to search job listings, get health care data, order sandwiches, locate stores that sell particular products in a mall, as well as obtain other important information. See, e.g., "The Kiosks Are Coming, The Kiosks Are Coming" Business Week, Jun. 22, 1992; "Local Firm Hopes Its Kiosks Will Be 'Shopping Oracles'" The Ann Arbor News, Sep. 1, 1992. None of these systems, however, involves providing travel destination information, making travel reservations, or the problems associated with presenting for review information concerning a variety of travel destinations while combining at the same time the capability for making reservations at these travel destinations.

A predecessor to the Travelvision ® system that is the subject of this application was demonstrated more than a year ago at a trade show in San Diego, Calif. This earlier system provided users with the ability to review information about a number of travel destinations, but did not have the capability for users to make travel reservations using the system. While users had some flexibility to select and review information about various different travel destinations, the making of reservations remained a separate undertaking. Thus, for this and other reasons, it was found desirable to improve that system.

SUMMARY OF THE INVENTION

The Travelvision ® system was developed to make possible not only obtaining information about a number of travel destinations on-site, but also making travel reservations and payment on-site. Thus, making travel plans is made convenient and less time-consuming.

The present invention additionally produces statistical records which provide relevant information relating to travel destination selections using the system. Thus, information is provided which can be used to evaluate the popularity of particular destinations.

Additional advantages, objects, and novel features of the invention are set forth in the following description and will be apparent to those skilled in the art upon examination thereof.

The Travelvision ® system achieves these objects through a method and apparatus for providing travel destination information and making travel destination reservations. In particular, the method is accomplished by first inputting and storing in a database information associated with various travel destinations. Each travel destination is identifiable by a unique set of parameters. For instance, parameters may identify the geographic area within which the destination is located, and the amenities, golfing facilities, hotels, etc. associated with that destination.

After inputting the database information, the system queries a user to select a particular travel destination. Once a travel destination is selected, a search of the database locates the records that match the selected destination. Information concerning the selected travel destination is then provided to the user. After reviewing this information, there is provided a way to make reservations in connection with the selected travel destination.

This invention may further provide the price associated with making travel reservations and also receive and detect payment associated with travel reservations.

Optionally, the invention counts, accumulates, and stores statistical information related to selected travel destinations.

Another feature of the invention is the capacity to provide printed information, such as receipt and confirmation of travel reservations, or printouts of accumulated statistical records.

The objects and features of the invention described above are carried out by an information kiosk with an information storage and retrieval device for storing, referencing and retrieving various travel destinations in the database. A querying device is used to prompt users to input information associated with specific travel destinations. A display device then displays the selected travel destination information. A communications device then connects the user with a travel destination reservation service so that the user can make reservations for the selected travel destination. The system may be additionally outfitted with a device, such as a credit card scanner, for accepting payment for travel reservations and a reproducing device, such as a printer, for delivering a receipt and confirmation of reservations which are made. In addition to storing travel destination information, the information storage and retrieval device may also be equipped to receive, store and retrieve statistical information relating to selected travel destinations. The reproducing device can be used to print out statistical records. A computer controls operation of the components described above.

BRIEF DESCRIPTION OF THE DRAWINGS

FIG. 5 is an illustration of the steps for accessing a travel destination reservation service, making payment, and reproducing a confirmation and receipt of payment;

DETAILED DESCRIPTION OF EMBODIMENTS OF THE INVENTION INCLUDING PREFERRED EMBODIMENTS

Figure 1:
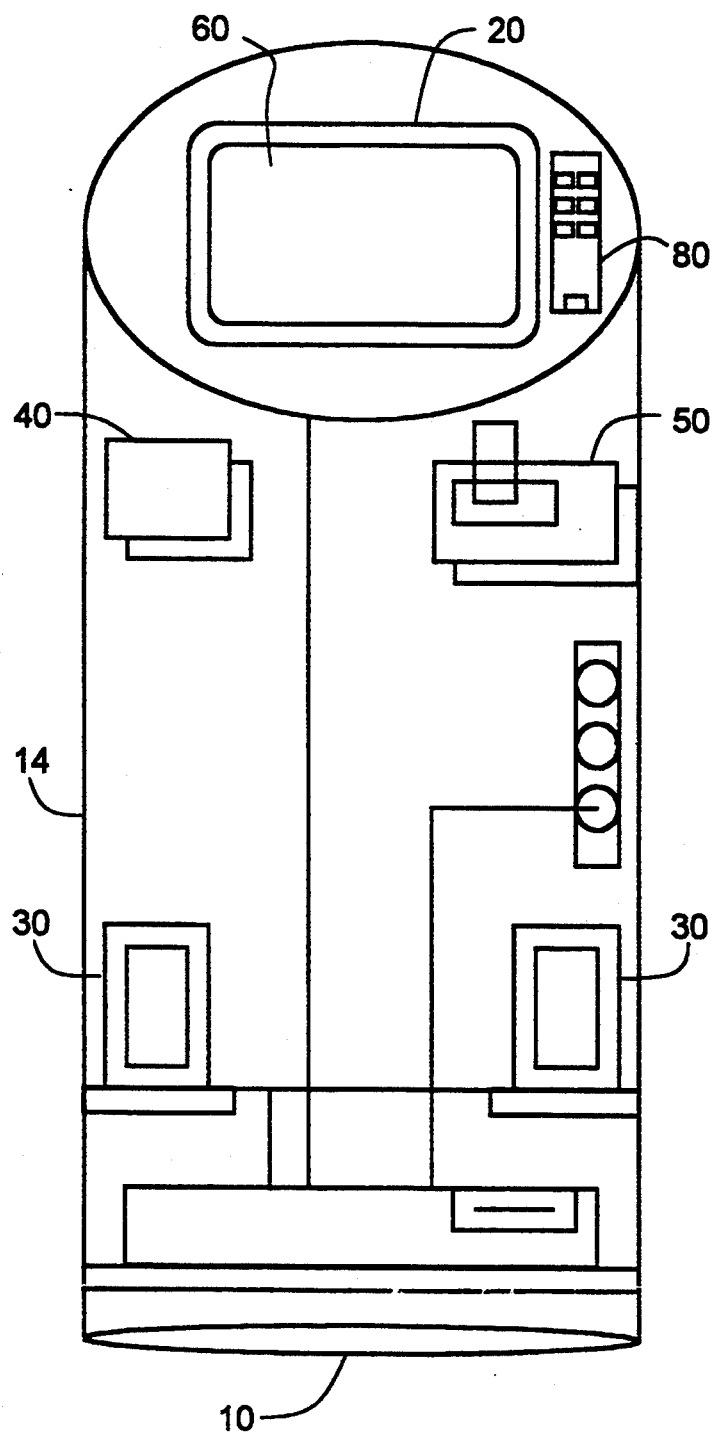
FIG. 1 is a front view of an apparatus for providing travel destination information and making travel destination reservations.

An embodiment of the system for providing travel destination information and making travel reservations 10 is shown in FIG. 1. The operation of the embodiment of FIG. 1 is described with reference to the diagram of FIG. 2. Information describing each travel destination is first stored in a database in one or both of CD ROM 11 or Hard Drive 12. 1.2 gigabytes is the minimum preferred storage space and an IDE type drive or SCSI device will work. This information may consist of information that can be displayed in textual, video or audio components. Textual information can alternatively be stored in a database at a remote location such as travel reservation center 258, and accessed using a modem 254 and telephone line 256 which in turn accesses a file server containing the textual database. A 9600 baud modem is used in the current commercial Travelvision ® system, but any other modem that is capable of downloading the textual database information for use by the system is suitable. Since telephone lines that are not fiber optic cannot currently accommodate the amount of data in a video file, the video files are stored in CD ROM 11 or hard drive 12. The current system is configured to accept standard 650 MB CD ROM disks, which can be slid into a cartridge inside the kiosk where the information stored thereon can be accessed by the information storage and retrieval system. Of course, other high density storage units which meet the specifications set forth herein, such as magnetic disk or tape media, solid state electronic data storage media, or the like can also be used.

Travel destination information in the database may be periodically updated by adding, deleting or modifying the existing information. Updating can occur remotely for textual information, or in an embodiment using a CD ROM for data storage, can simply be done by replacing the CD ROM disks housed in the Travelvision ® unit.

The entire system is housed in a cylindrical kiosk 14. In the current Travelvision ® system, the housing is 42" high and has a 27" base, but the dimensions can be varied to a certain degree, for instance, to take into account the physical location or significant physical attributes of the predominant users (such as height). A locked panel (not shown) may be provided in the back of the housing so that disks can be removed and replaced. In the preferred embodiment, vent holes and internally mounted fans are provided in the kiosk to prevent the touchscreen from becoming too hot to touch, which may occur during operation.

Each travel destination in the database, regardless of database organization, is characterized by certain parameters. Each destination is assigned a unique parameter which is used to identify it from other travel destinations in the database. Each destination may also have one or more parameters which are used to group the destination into one or more travel destination areas. Each destination can also contain parameters identifying information describing additional features associated with the destination such as golf, tennis, hotels or other amenities, or travel packages or other special travel offerings associated with that destination. There may also be provided one or more travel destination parameters which identify the price associated with making travel reservations for that destination, such as the price for a round of golf at the Turnberry Isle Resort and Club which is the representative travel destination depicted in FIGS. 9–11. Each travel destination has as many parameters as are necessary to define the destination for purposes of retrieving and displaying the information which is associated with the travel destination. The parameters defined may be used to aid display of the information in any desired format.

Figure 2:
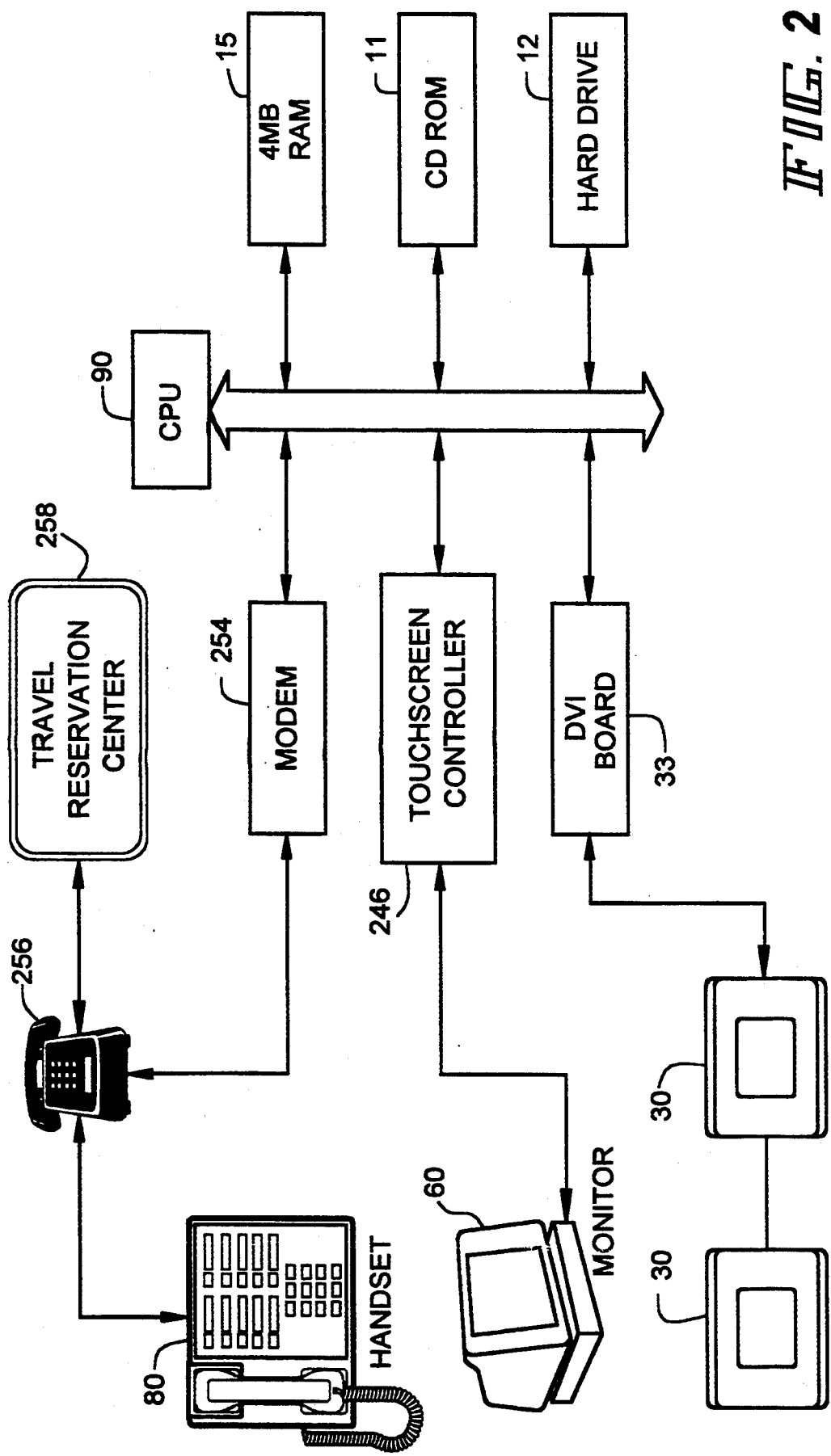
FIG. 2 is a diagram of the interrelation of the system components.

The embodiments of FIGS. 1 and 2 also contain a monitor 60 which displays query screens as well as textual and video information about selected travel destinations. Optionally, the monitor may also be used to display information helpful for making travel reservations such as the price associated with a particular reservation. The current commercial TravelVision ® system, for instance, uses a 14" SVGA monitor that can be retrofitted with a touchscreen 20, although any other means for display suitable for carrying out the above described functions may be used, such as an ordinary television screen.

Input is made in the embodiment of FIGS. 1 and 2 by way of a touchscreen 20 which overlies the display monitor 60. A Touchscreen PC bus controller 246 used in conjunction with the overlying touchscreen provides a touch activated user interface. The current commercial TravelVision ® system employs a Touchscreen sold by ELOGRAPHICS of Oak Ridge, Tenn. Interaction takes place by the user touching one of the zones. A display screen has one or more touch zones defined. When a touch zone is activated, a defined parameter associated with the activated touch zone is input and the database is searched to retrieve information corresponding with the input parameter. For example, the touch zone may define an input parameter corresponding to a particular travel destination such as the Turnberry Isle Resort and Club represented as the selected travel destination in FIGS. 9–11. Interaction using a touchscreen such as the one used here is further described in U.S. Pat. No. 4,712,191. Of course, other interactive means may be used for accepting input by the user, such as a trackball, a mouse, or a keyboard.

When the input parameter is that defined for a specific travel destination, the information concerning the selected travel destination is then displayed on the monitor 60 which underlies the touchscreen 20. In the current commercial TravelVision ® system, the information displayed on the monitor 60 is in both textual and video format. Optionally, and in the preferred embodiment, audio information is also provided and communicated through the speakers 30.

Making reservations associated with a selected travel destination is made possible by establishing a communications line between the user and travel reservation center 258. In the embodiment of FIGS. 1 and 2, this communication link is made through the handset 80 which is connected to telephone line which in turn is connected to the travel reservation center. The link is established when the user simply picks up the attached handset 80. In one alternative embodiment, a communication link between the user and the travel reservation center 258 might be established by simply pressing an appropriate touch zone. Once the communication line is established, reservation center operators may then assist the user with inquiries and reservations. In the preferred embodiment, this communications line is established without any need to dial a telephone number or other destination identification code. Though this embodiment uses a telephone link for communicating purposes, any method for communicating with a remote location may be substituted, such as radio or other wave transmissions. In the embodiment of FIG. 1, users converse with representatives at the center using the provided handset. 80.

In the embodiment of FIG. 1, and further detailed diagrammatically in FIG. 2, a suitable computer, or CPU, 90 coordinates the operation of the various system components. A 486DX 33 megahertz central processing unit (CPU) with 4 megabytes of RAM is preferred, but most IBM compatible 386SX, 386, or 486 with at least 4 megabytes RAM are suitable for operation of the system. In operation, when a touch zone is activated, the computer receives the input parameter conveyed through the touchscreen controller 246. The information storage and retrieval system, which includes the CPU 90, the 4 MB RAM 15 and the hard drive or CD ROM containing the database information, receives the input parameter, retrieves the corresponding information and through the CPU the information is directed to the display monitor 246 and/or the speakers 30. When information is directed to the speakers, it is conveyed through a DVI board 33. The current commercial Travelvision ® system uses an Intel DS2 DVI audio/video board which fits in a PC 16 bit expansion slot for this purpose. The TravelVision ® system uses an Intel proprietary DVI board to display full motion 30 frames per second video, audio, and high resolution stills. The speakers 30 may be of any desired size or type so long as they are self-amplified. The speakers need not be self-amplified if an amplifying box is included in the system. A 16 bit Enchanced Video graphics adapter which fits in any PC expansion slot in the CPU 90 is used to control graphics display on the monitor 60.

When the input parameter indicates that the user would like to make travel reservations concerning a selected travel destination, the computer 90 receives the signal and sends an output signal which connects the user to the travel reservation center 258 through telephone line 256. The modem 254 connected to this phone line is switched off, or in other embodiments, two phone lines may be provided, with the line not connected to the modem being the communications line for the user.

With reference to FIG. 1, the system can include additional features, such as a valuable media acceptor and/or a reproduction means. The system may also include a record keeping facility to keep track of information related to the selection of destinations. A credit card scanner 40 is depicted as the valuable media acceptor in FIG. 1. By swiping a credit card appropriately along the scanner, the scanner links directly to the appropriate credit card service via a communications line independent of telephone line 256. The number on the card can be read or verified, and the appropriate account debited the amount associated with the travel destination reservations made by the user. Other valuable media accepting means, such as those used by commercial 24 hour banking machines, may also be used. It is believed that any commercially available credit card scanner suitable for integration with the system can be used.

As illustrated in FIG. 1, the system has the capacity to reproduce travel destination information, receipts for reservation payments, confirmation numbers for travel destination reservations, or other information considered helpful in connection with providing information on travel destinations or making travel reservations. In FIG. 1, a printer 50 is provided for this purpose, although any suitable means of reproduction that can be effectively incorporated into an on-site system, could be used. Providing a printer in an information kiosk is further described in U.S. Pat. No. 4,817,043.

The system of FIG. 1 may also be equipped with a record keeping facility for keeping track of statistical information related to travel destination selections. In the simplest fashion statistical information on how many times each destination has been selected would be counted and accumulated in the following manner. Each travel destination would have a field defined for the number of times that destination was selected, initially assigned a value of zero. Each time that particular travel destination is selected, this field would be iterated by one, and the new value would be stored. This process could be accomplished, optionally, for the number of times reservations are made at a destination, each time a particular type of additional information about a destination is selected, or for each time reservations are made concerning a particular feature offered at a travel destination. One of skill in the art would appreciate multiple variations for record keeping and production of statistical information that could be accomplished.

When provided with a record keeping facility, the system also provides a way of retrieving the statistical information. Record retrieving may be accomplished either on-site or at a remote location. In one embodiment for on-site retrieval, a touch zone is provided which, when activated, signals the computer to retrieve the record-keeping information. Once retrieved, this information can be viewed on-screen, or reproduced in hard copy using the printer or other reproducing means. Record keeping retrieval can further be aided by providing a series of queries to the user for selection from among record retrieval options which could be displayed on screen using a menu or other suitable organizational technique. Selection of an available record keeping retrieval option might permit viewing the records on screen, printing a copy of the records, or selecting from among the available record keeping statistics for those the user desires to review. In the preferred embodiment for on-site record keeping, the touch zone for accessing record keeping facilities is invisible to the user, so that only someone knowing where the zone is located is likely to touch it. Access to the record keeping function might also be password protected to further prevent unauthorized uses. In an embodiment providing for remote access of statistical information, access may be had along the telephone line 256 and attached modem 254 described above. Upon retrieval, these statistics can be used for the purpose of establishing travel destination popularity or for other marketing and advertising purposes.

The system described is also capable of interfacing with other computer software and can be operated to interactively perform functions in addition to providing for on-site review and making of travel destination reservations. For instance, the system may be adapted so that users can compute their golf handicaps, so that users can obtain a golf club fitting so that users can order golf equipment, or so that users can view information about upcoming events, tournaments and schedules at the system location or elsewhere. The information may be obtained through user interaction with the touchscreen display, in connection with the appropriate software. Information obtained using this software can be printed using the reproduction means provided with the system.

Further understanding of the apparatus of the present invention can be obtained from reading the discussion provided below regarding the description of the method for obtaining travel destination information and making travel reservations.

Figure 3:
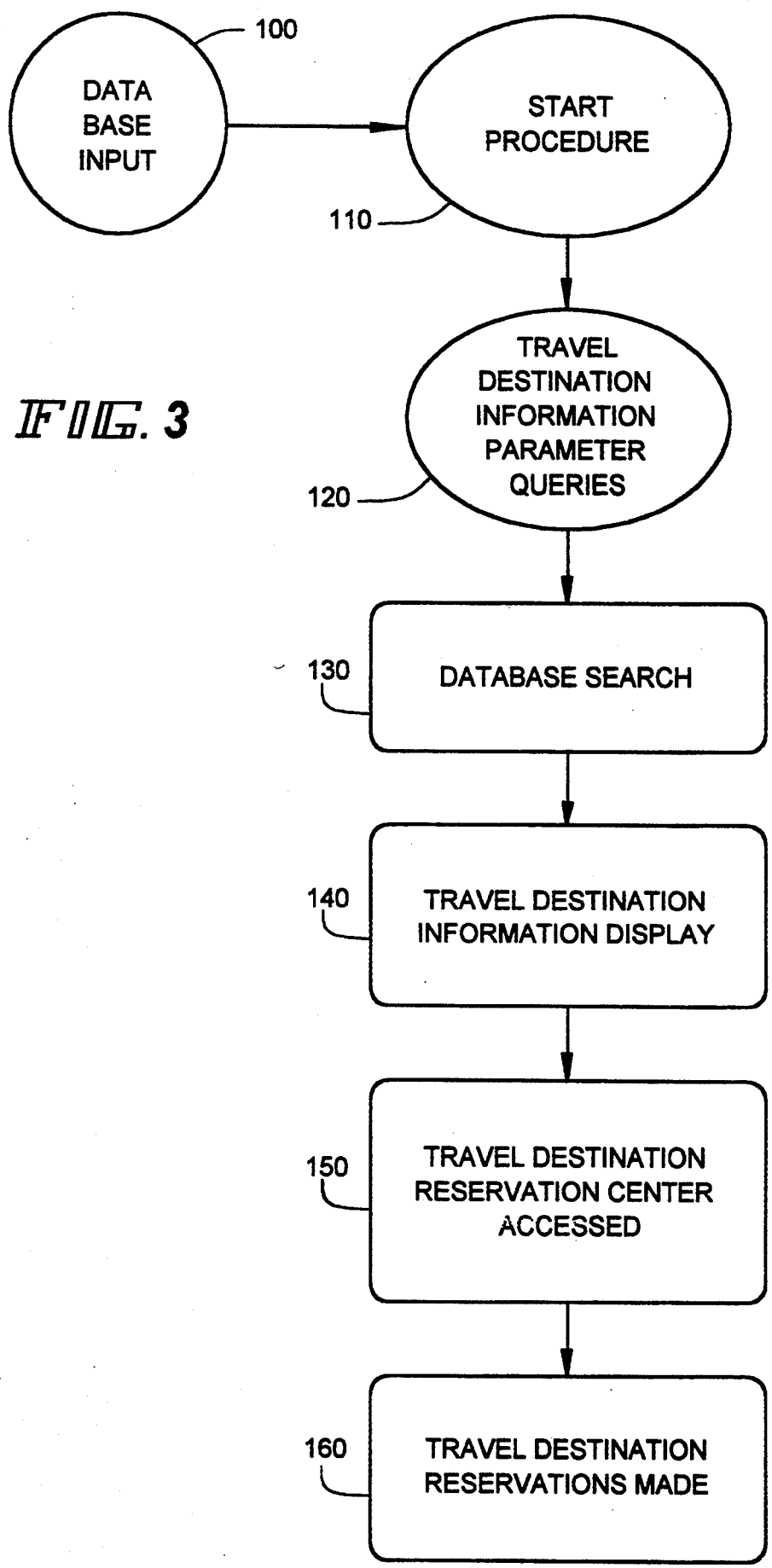
FIG. 3 is a flowchart of the overall method of this invention.

The overall method of operation for the on-site travel destination information and reservation system is best seen by referring to FIGS. 2 and 3 simultaneously. The method of the present invention begins at the data base input 100, where travel destination information is placed into the information storage and retrieval system, such as the hard drive 12 of FIG. 2. Step 110 is a start procedure which is used to introduce the user to the system. After the start procedure 110 has been activated, the method proceeds to step 120, where interactive queries for travel destination information parameters are generated on the display device, shown as a monitor 60 in FIGS. 1 and 2. The queries prompt the customer to input data information parameters which define a particular travel destination about which information is desired. Once the data information is input, the system performs a database search 130 to locate those travel destinations which match the input selection made by the user in step 120. The method then effects a travel destination information display 140 using the monitor 60, and optionally using audio speakers 30. If a user desires to make reservations concerning a selected travel destination upon viewing the travel destination information display 140, a travel destination reservation selection is made and the system then performs step 150, accessing a travel destination reservation center. This may be accomplished through a series of on-screen queries that setup the travel reservation, which is later relayed to or accessed by the travel reservation center through telephone line 256 and modem 254. It may also be accomplished by directly linking the user to a remote location where information about travel reservations can be immediately obtained. After the travel destination reservation center is accessed; travel destination reservations can be made 160.

Figure 4:
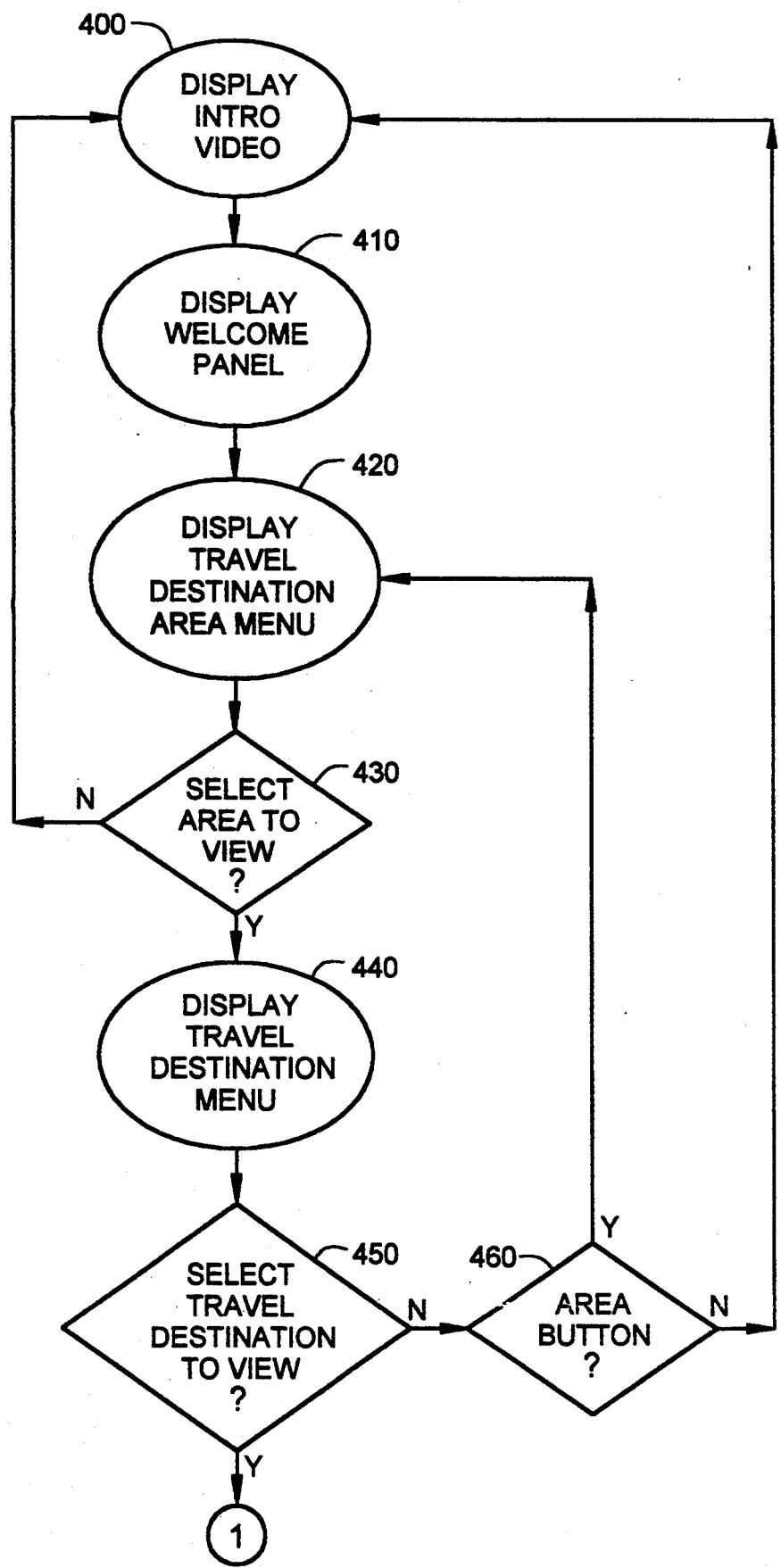
FIG. 4 is a detailed flowchart of the query and display steps of FIG. 3.

It is anticipated that the overall method just described can be most easily performed by programming the computer to execute the steps of the method. The following description of one detailed embodiment of a process for practicing the method will therefore refer to conventional flow charts depicted in FIGS. 4, 4a and 5 for explanatory purposes.

Figure 6:
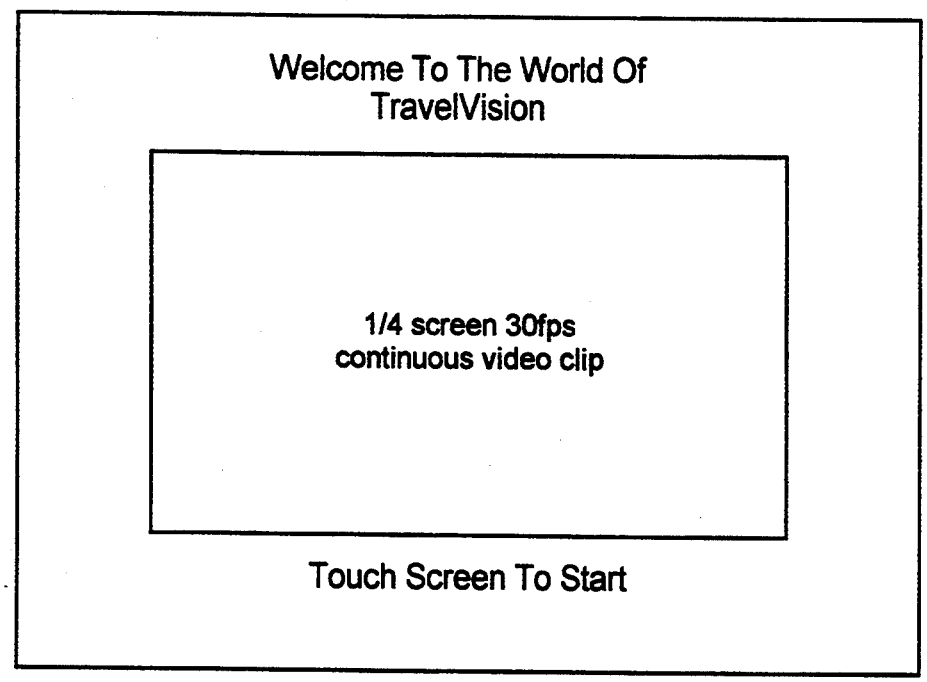
FIG. 6 is a representative still display of the intro screen of the invention.

In the current commercial TravelVision ® system there is provided a start procedure consisting of a display intro video 400 which continuously plays a video lead and accompanying audio. An example of that screen is shown in FIG. 6. When the display intro screen is touched by a user, that display is replaced and is followed by the step of displaying a welcome screen 410. The welcome screen includes further introductory information about the TravelVision ® system and how to use it. Providing such a screen is entirely optional. After a pre-set time period, the welcome screen is replaced and followed by the step of displaying a travel destination area menu 420.

Figure 7:
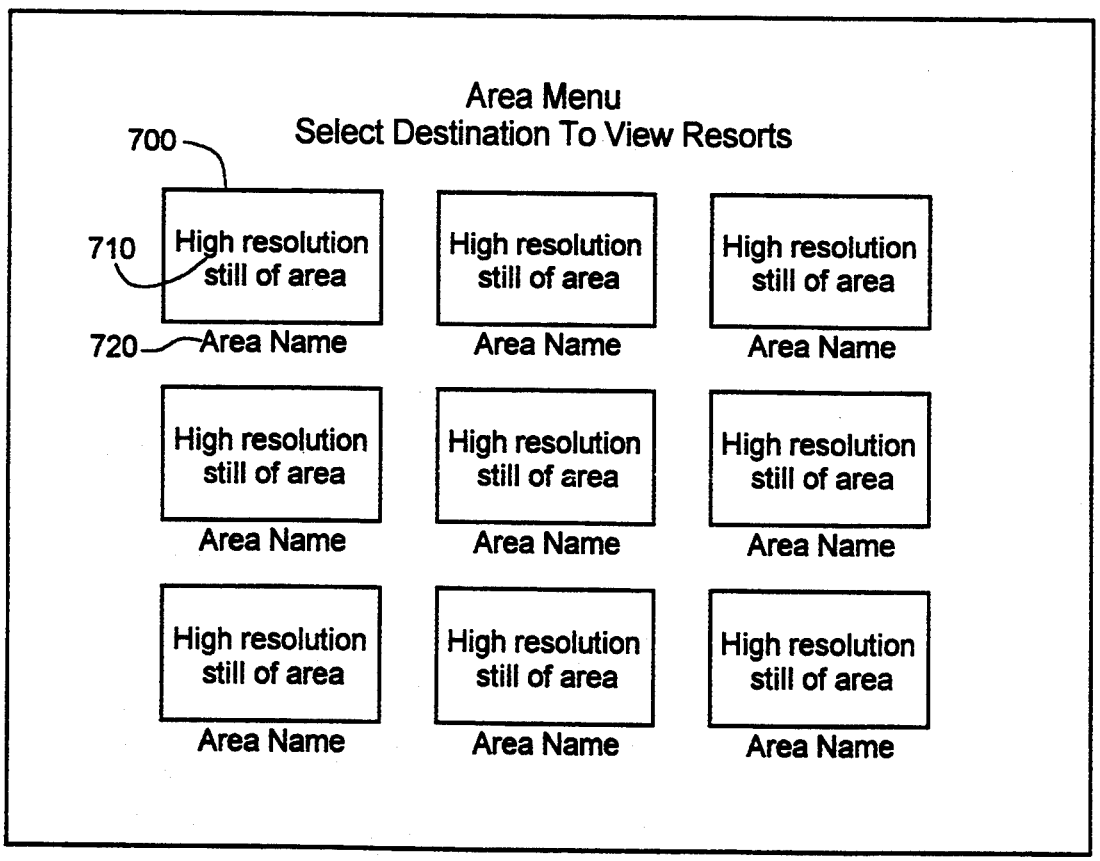
FIG. 7 is a representative query and display screen for an area menu.

A representative travel destination area menu screen from the current TravelVision ® system is shown in FIG. 7. Displayed on-screen is a number of touch zones 700. These touch zones prompt the user to select a travel destination area to view 430. Each zone includes a high resolution still of the particular travel area 710, and a textual description of that travel destination area 720. By touching a zone 700 corresponding with a particular area name, the area parameter is input and the screen of FIG. 7 is replaced and followed by a travel destination menu display 440. When the system includes a considerable number of travel destinations, it is convenient for purposes of review to group this information, such as by area as is done in the current system. However, grouping is a matter of convenience only, and groupings other than by area, such as by alphabetical order, or any other means of classification deemed appropriate or effective may be substituted. For instance, a simple system could bypass the screen of FIG. 7 and after the welcome screen display instead the screen of FIG. 8 described below.

Figure 8:
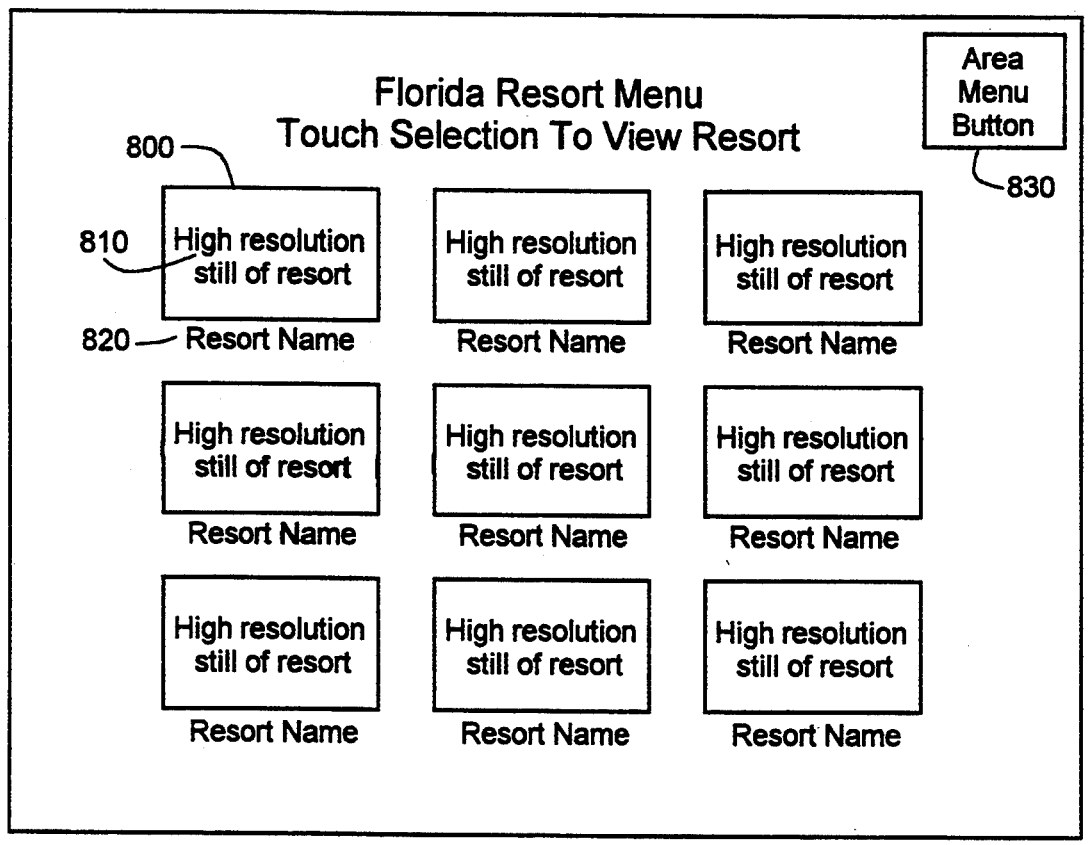
FIG. 8 is a representative query and display screen if the FLORIDA travel destination area is selected from the area menu of FIG. 7.

The screen of FIG. 8 is an illustration of a representative travel destination menu display if the FLORIDA travel destination area had been selected from the area menu of FIG. 7. This screen depicts a number of touch zones corresponding with particular travel destinations within the FLORIDA travel destination area. The displayed touch zones 800 each correspond to particular travel destinations that have been assigned parameters associating them with the FLORIDA area, and each includes a high resolution still of a feature associated with the particular travel destination 810 and an accompanying textual description of the travel destination 820. In an embodiment which includes an initial screen or screens grouping travel destinations, a return touch zone 830 is provided so that the user can return to the previous query screen without viewing any further information about the travel destinations within the selected grouping. This also corresponds with step 460 in the flowchart of FIG. 4. In embodiments where groupings are made but the number of travel destinations within a particular group exceeds the number of touch zones considered desirable for that screen, a separate scroll touch zone (not shown) may be provided so that the user can select from additional travel destinations within the group. These touch zones prompt the user to select a travel destination to view 450.

Figure 4A:
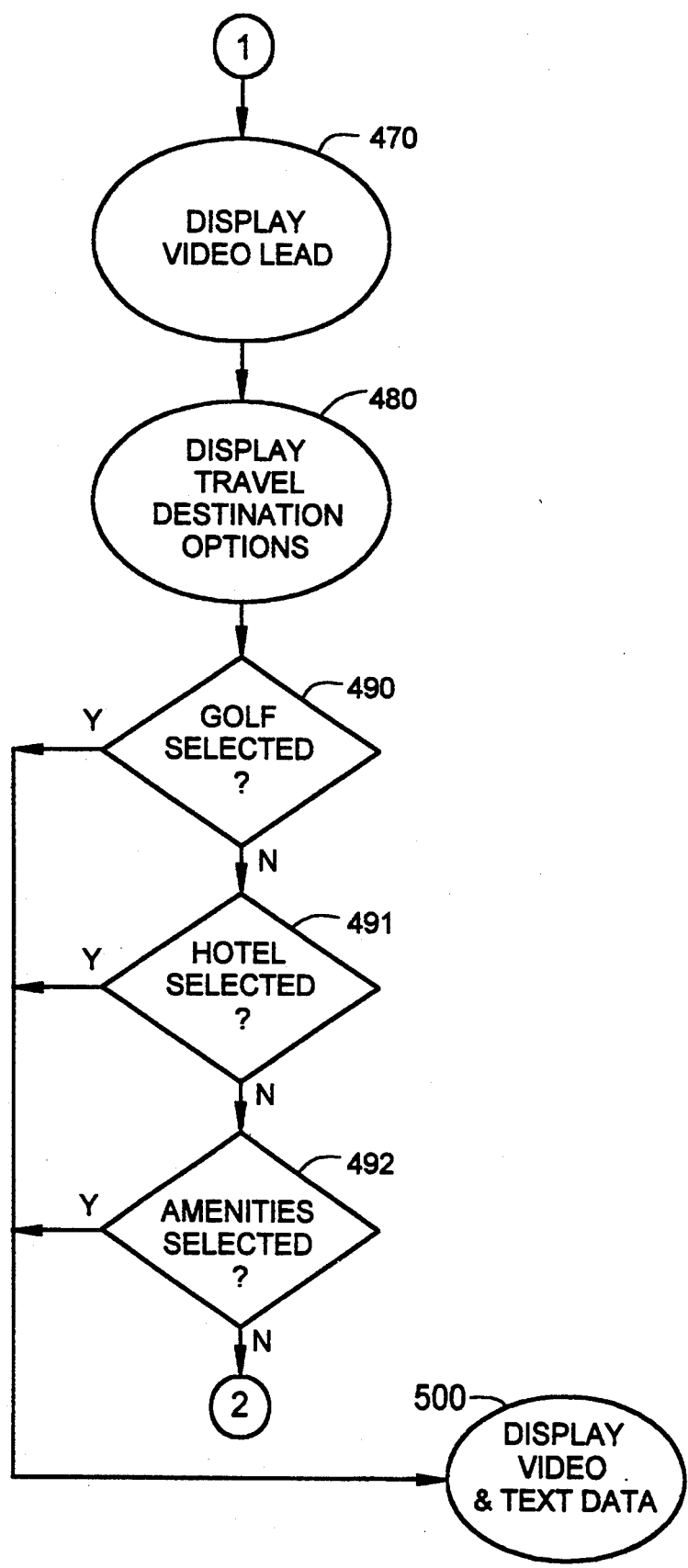
FIG. 4a is a continuation of the flowchart of FIG. 4.
Figure 9:
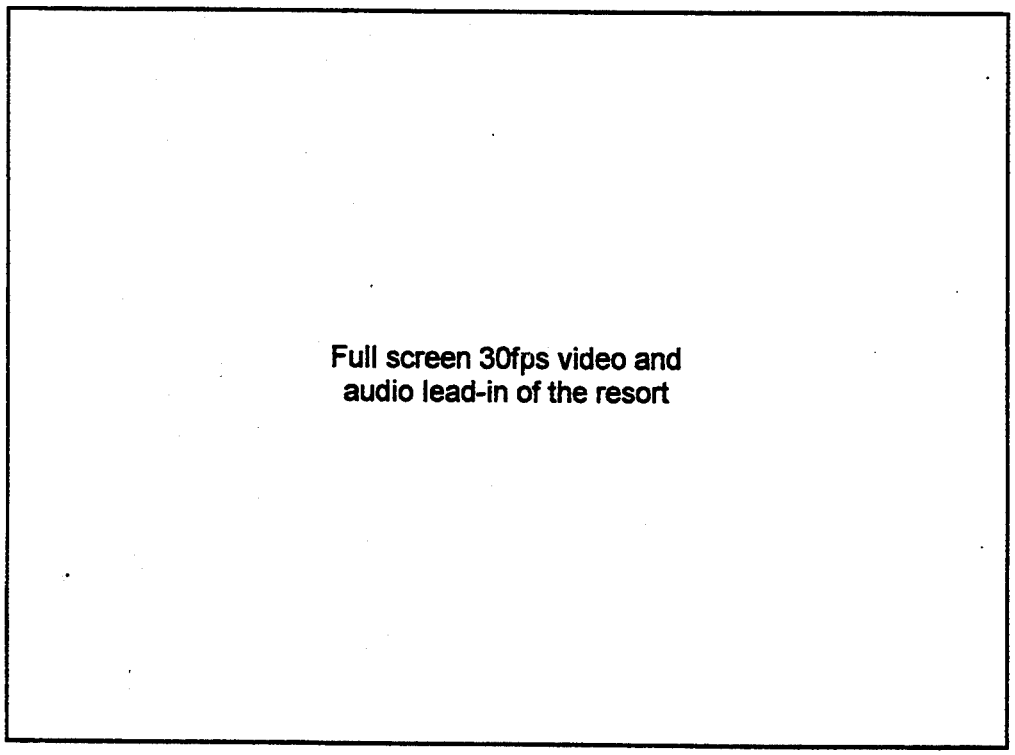
FIG. 9 is a representative travel destination information screen which is displayed upon selection of the Turnberry Isle Resort and Club travel destination from the FLORIDA travel destination area of FIG. 8.
Figure 10:
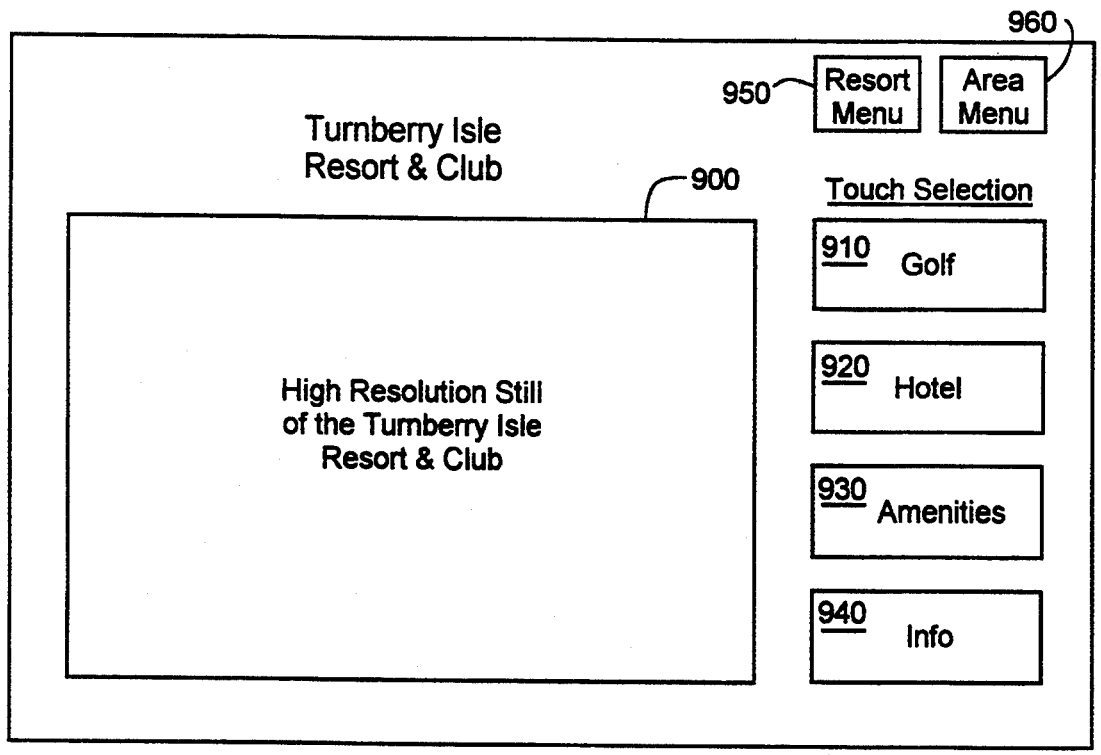
FIG. 10 is a representative still of the additional travel destination information screen which is displayed after the travel destination information of FIG. 9 is displayed.
Figure 11:
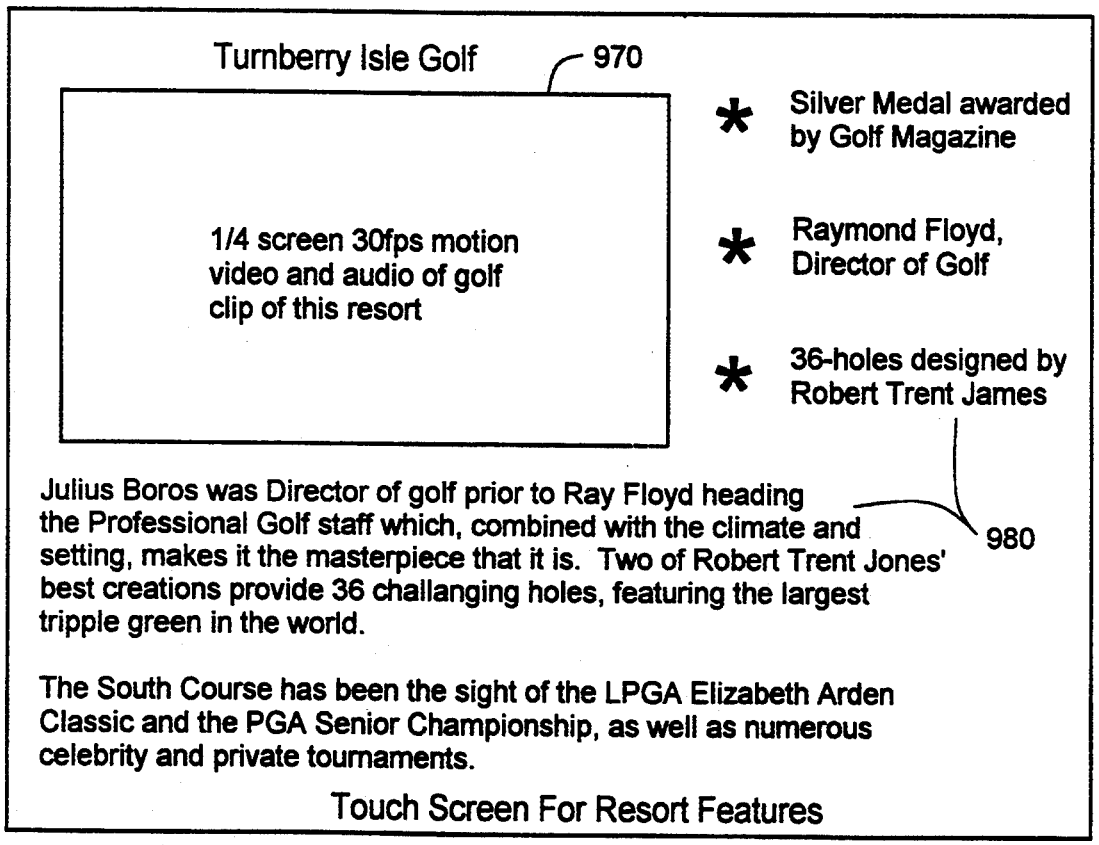
FIG. 11 is a representative still of the additional travel destination information screen which is displayed if additional information on Golf at the Turnberry Isle Resort and Club is selected from FIG. 10.

When a user activates a particular travel destination by touching the appropriate touch zone, information about the selected travel destination is provided. FIGS. 9, 10 and 11 are representative screens from the current Travelvision ® system assuming the Turnberry Isle Resort and Club is selected from the query screen of travel destinations in the Florida travel destination area, shown in FIG. 8. With reference now to FIG. 4a and FIG. 9, once the user selects a travel destination, the system displays a 15–45 second full screen 30fps video lead 470 and accompanying audio that describe the travel destination.

After the video lead is displayed, a screen that displays travel destination options 480 follows. The Turnberry Isle Resort destination option screen is depicted in FIG. 10. A high resolution still 900 of the destination and a number of touch zones which correspond to particular features associated with the selected travel destination about which additional information can be obtained are displayed. In FIG. 10, for example, a touch zone is provided to obtain further information golf 910, hotels 920, or amenities 930 at Turnberry Isle Resort. Optionally, this screen may be provided with return touch zones such as described above respecting FIG. 8. A return touch zone may be provided to return to the travel destination screen 960 of FIG. 8 or to return to the grouping of travel destinations screen 950 in FIG. 7. If more information on features of a particular travel destination is provided than the desired number of touch zones, a scroll touch zone can again be provided. Although the additional information screen in FIG. 10 is included in the current Travelvision ® system, it is not required to practice the overall method of this invention.

In a typical scenario the user can opt to view additional information about features that include any one of golf 490, hotels 491 or amenities 492. If the user makes such a selection by touching the appropriate touch zone (for golf at Turnberry Isle Resort the user would activate touch zone 910 of FIG. 10) the screen is replaced and followed by a display of additional video and text data pertaining to the feature selected 500.

FIG. 11 illustrates a typical screen from the current TravelVision ® system providing additional video and textual information about a particular feature of a selected travel destination. The screen of FIG. 11 would be displayed if additional information on golf 910 at the Turnberry Isle Resort was selected from the screen of FIG. 10. An additional video clip 970 (with accompanying audios) relating to golf at Turnberry Isle Resort is displayed. Textual information about golf at Turnberry Isle 980 is also displayed. In the current Travelvision ® system, touching any portion of the screen of FIG. 11, during or after the video presentation, returns the user to the screen of FIG. 10. When any of the screens of FIGS. 7–11 are displayed, the screen will revert to the display screen of FIG. 6 if no touch zone is activated within a pre-set time period. In the current Travelvision ® system, that time period is two minutes.

With reference now to FIGS. 5 and FIG. 10, the steps of accessing a reservation center and making reservations using the system will be described. When the additional information screen such as depicted in FIG. 10 is displayed, a touch zone entitled "info" 940 may be provided. Activating this touch zone results in the replacement of the screen of FIG. 10 and the display of an information screen 505. From this screen, a touch zone is provided which queries the user for input parameters so that the user can make reservations associated with the particular travel destination 510. Additional touch zones may be provided to query the user to go back to the area menu 530, 535 as previously described with respect to FIGS. 9 and 10, or to go back to the optional information menu of FIG. 9. If two minutes passes without a selection 550, 551, the info screen 505 is replaced with the intro screen 400. Of course, this step is not confined by use of the info screen 940. For instance, in a simple system a query to access a travel reservations center might appear in connection with displaying travel destination information (FIG. 9) (such as an overlay) or from the travel destination information screen of FIG. 8.

If the user chooses to make reservations, the step of accepting reservations 515 is performed. This step is further described in connection with the description of the system above. The step of accepting reservations is most conveniently and efficiently performed through the computer 90, which accesses a means for making travel reservations, such as a travel reservation center 258 via direct phone link 256, or programming which accepts and records travel reservations and then transmits them to a remote location such as center 258. Any accessing method which can accurately determine availability of reservations within an acceptable time frame is acceptable, including establishing a direct link with the travel destination itself. Reservations may be made by the system based on instructions from the user either verbally or through entry of input parameters in response to queries displayed by the system in connection with obtaining the necessary information for making and accepting reservations.

Additional optional steps may be provided in connection with the method just described. In connection with making travel reservations 160, there might be provided a step of accepting payment for the reservations. With reference to FIG. 5, this step can be performed by the computer 90 which coordinates the display of a payment procedure 520. The system may then prompt the user to make a specified payment 521 which the user can do, for instance, using the credit card scanner 40 of FIG. 1. It can then be automatically determined what credit card number has been entered, whether the payment can be properly charged to the credit account, and if so the account can be appropriately debited. Alternatively, the system can prompt the user for entry of the credit card number, for instance, through a number pad appearing on the touchscreen. If the payment has not been made or accepted, the system might additionally include a query asking the user to enter or re-enter the credit number 522. If the correct payment cannot be made after a set time period or set number of attempts, the intro screen may be displayed and the reservations cancelled. Of course, many other screen options are available if payment is not received, including going back to the info screen 505 or the additional information screen 480. In addition, the system need not automatically cancel the travel reservations just because the displayed payment is not made.

The method may also include the step of printing confirmation and receipt of travel destination reservations. In FIG. 5, this step is shown following a successful confirmation that the displayed payment has been made. However, the step of reproducing receipt and confirmation of travel reservations can be accomplished without regard to payment being made. In the embodiment described by the flowchart of FIG. 5, the computer 90 directs information concerning the selected travel destination reservation to the printer 560. The printer then prints the confirmation and receipt 561 and it is dispensed to the user 562. The printing may be controlled through queries originating from the info screen 505 at the option of the user, may be done automatically whenever a reservation is made, or may be accomplished in any other desirable manner. The step of printing a receipt can be accomplished, if desired, irrespective of which screen is displayed.

Another significant option for the present method is the step of accounting for information related to the selection of travel destinations. As previously explained, the computer may be programmed, and the database configured, to record statistical information concerning travel destination selections, whether it relates to specific travel destination areas, particular travel destinations, particular features at travel destinations, or any other selections about which statistical information is desired. The information storage and retrieval system simply includes a field initially assigned a value of zero and associated with a particular data input parameter. Whenever that data parameter is input, the computer retrieves the field and increments the record by 1.

The step of retrieving the accumulated accounting information may also be performed by the system. Again as further described above in connection with the system description, activating an appropriate touch zone on any screen can cause the system to display a statistical records menu. These records might alternatively be accessed from a remote location using the modem 254 and the telephone line 256. A series of queries can be provided which direct the computer to display on screen or print on hard copy, either remotely or on-site, statistical records related to the selection of travel destinations. For instance, a user might, on-site, select to have a printed copy of the number of times each travel destination within the FLORIDA travel area has been selected for the purpose of comparing the relative popularity of travel destinations within the Florida area. After inputting the appropriate data parameters in answer to displayed queries, the computer would access the information storage and retrieval system for all travel destinations within the FLORIDA travel area, and print out a list, in a provided pre-programmed format, containing the name of each resort and the number of times it had been selected to date.

Another significant option which may be provided in connection with the method is for the system to have the capability for receiving orders for additional information supplementary to that provided on-site. This may be accomplished, for instance, by providing a query referred to as a "brochure button." When activated, the user is prompted to enter their name and address by touching letters and numbers on the display screen which simulates a keyboard. This information is then stored by the information storage and retrieval system, and can be retrieved by, for instance, TravelVision ® reservation staff who will then send out a brochure to the requesting party. Of course, additional information about the user can be requested from other screens, such as the welcome screen, if desired. Additional information about the user may also be requested, such as room preference, number of children, preferred vacation areas, need for babysitting, or other desirable information. The brochure button may be displayed, preferably, in connection with the additional information menu of FIG. 10, or in connection with the information screen 505.

The foregoing is considered illustrative only of the principles of the invention. Numerous modifications, adaptations, and configurations of the described invention will readily be apparent to those skilled in the art. It is not desired to limit the invention to the exact method or apparatus as shown and described above. Accordingly, all suitable substitutions, modifications, and equivalents may be considered as falling within the scope of the invention defined by the following claims.

I claim:

1. A method of providing travel destination information for self-service selection and viewing and for facilitating the initiation of communications to make travel reservations without the aid of a travel agent or travel professional, comprising the steps of:
   (a) inputting information concerning a plurality of travel destinations into an information storage and retrieval system for storing, referencing and retrieving the travel destination information where each travel destination is uniquely identified by at least one travel destination parameter;
   (b) querying the user for input data, the input data being at least one travel destination information parameter for identifying information associated with the travel destinations;
   (c) searching the information storage and retrieval system for travel destinations corresponding to the travel destination information responsive to the selection made by the user without the aid of a travel agent or travel professional;
   (d) displaying the information associated with the selected travel destination;
   (e) accessing a remotely accessible source for making travel destination reservations.

2. The method of claim 1 further comprising the additional step of making a reservation at a selected travel destination using the remotely accessed source for making travel destination reservations.

3. The method of claim 1 wherein the steps of querying, searching, and displaying travel destination information are defined further to include the steps of:
   displaying an intro screen that continuously plays a message;
   displaying, in response to input made by a user while the intro screen is displayed, a plurality of travel destination areas into which a plurality of travel destinations have been pre-grouped;
   querying the user for data input information concerning a displayed travel destination area;
   searching the information storage and retrieval system for travel destinations having travel destination area information identified by the data input by the user;
   displaying the travel destinations having the identified travel destination area information.

4. The method of claim 3 wherein the steps of querying, searching, and displaying are defined further to include the steps of:
   querying the user for data input information concerning a travel destination from among the displayed travel destinations;

searching the information storage and retrieval system for travel destinations having travel destination information identified by the data input by the user;

displaying information concerning the identified travel destination.

5. The method of claim 4 wherein the steps of querying, searching, and displaying travel destination information are defined further to include the steps of:

displaying an information menu for obtaining additional information concerning the selected travel destination;

querying the user for data input information concerning additional information about the selected travel destination;

searching the information storage and retrieval system for additional information identified by the data input by the user;

displaying the additional information selected by the user.

6. The method of claim 3 including the additional step of displaying a plurality of travel destination areas in response to data input information supplied when a plurality of travel destinations are displayed.

7. The method of claim 4 including the additional step of displaying a plurality of travel destinations in response to data input information supplied when information concerning a selected travel destination is being displayed.

8. The method of claim 5 including the additional step of displaying the additional information menu concerning a selected travel destination in response to data input information supplied when additional information concerning a selected travel destination is being displayed.

9. The method of claim 1 including the additional step of receiving orders for additional information associated with a selected travel destination in addition to the information contained in the information storage and retrieval system.

10. The method of claim 1 further comprising the steps of entering into the information storage and retrieval system at least one accounting indicator and accumulating information related to travel destination selections.

11. The method of claim 10 further comprising the additional step of accessing the accumulated information.

12. The method of claim 1 wherein the step of accessing a means for making a travel destination reservation includes interactive audio communication with a remotely accessible source for making travel reservations.

13. The method of claim 1 further comprising the steps of inputting into the information, storage, and retrieval system information concerning a predetermined charge code associated with each of a plurality of travel destinations; each code being associated with an amount of money associated with making reservations associated with a selected travel destination;

instructing the user to pay the amount associated with making a selected travel destination reservation;

reproducing a receipt and confirmation associated with the selected travel reservation.

14. The method of claim 13 further comprising the additional step of detecting receipt of the instructed amount.

15. An apparatus for self-service selection and review of travel destination information and for initiating communications for making travel destination reservations in response to a plurality of input data set items provided by a user without the aid of a travel agent or a travel professional, comprising:

(a) Information storage and retrieval means for storing, referencing and retrieving information on a plurality of travel destinations, each of the travel destinations being identified by at least one travel destination parameter;

(b) Querying means for querying the user to select from among the plurality of travel destinations without the aid of a travel agent or travel professional;

(c) Input means for receiving a travel destination information selection from a user without the aid of a travel agent or travel professional;

(d) Display means for displaying a travel destination information selection made by the user;

(e) Communication means for accessing a remotely accessible source for making travel destination reservations;

(f) Control means connected to the information storage and retrieval means, display means, query memos, input means and communication means for controlling and coordinating the operation thereof.

16. The apparatus of claim 15 further comprising means for accepting payment of amounts associated with travel destination selections or travel destination reservations.

17. The apparatus of claim 15 further comprising means for reproducing information related to travel destinations or travel reservations selected by a user.

18. The apparatus of claim 15 where the display means includes means for audio and visual presentation of information associated with a selected travel destination.

19. The apparatus of claim 15 where the reproducing means includes a printer.

20. The apparatus of claim 15 where the information, storage and retrieval means comprises a hard disk, a CD ROM, a microcomputer CPU and at least 4 MB of random access memory.

21. The apparatus of claim 15 where the input means includes one of the group of a touchscreen, a trackball, a mouse, or a keyboard.

22. The apparatus of claim 15 further comprising accounting means for counting and accumulating information related to selected travel destinations.

23. The apparatus of claim 22 further including means for accessing the accumulated information related to selected travel destinations.

24. The apparatus of claim 15 further including means for modifying, deleting and adding travel destination information to the information, storage and retrieval means.

25. The apparatus of claim 15 further including means for modifying, deleting and adding travel destination information to the information, storage and retrieval means from a remote location via communication link.

26. The apparatus of claim 15 where the communications means comprises a means for establishing audio communications with the remotely accessible source for making travel reservations.

27. A method of providing golf-related information for self-service selection and viewing and for facilitating the initiation of communications associated with the provided golf-related information without the aid of a golf-related information agent or golf professional, comprising:

(a) inputting information concerning a plurality of travel destinations into an information storage and retrieval system for storing, referencing and retrieving the golf-related information, each record of golf-related information being uniquely identified by at least one golf-related information parameter;

(b) querying the user for input data, the input data being at least one golf-related information parameter; (c) searching the information storage and retrieval system for golf-related information corresponding to the golf-related information responsive to the input data selection made by the user without the aid of a golf-related information agent or golf professional;

(d) displaying the information associated with the selected golf-related information;

(e) accessing a remotely accessible source for inquiring about golf-related information.

28. An apparatus for self-service selection and review of golf-related information and for initiating communications for making inquiries concerning golf-related information in response to a plurality of input data set items provided by a user without the aid of a golf-related information agent or golf professional, comprising:

(a) Information storage and retrieval means for storing, referencing and retrieving golf-related information, each record of golf-related information being identified by at least one golf-related information parameter;

(b) Querying means for querying the user for input data, the input data being at least one golf-related information parameter;

(c) Input means for receiving a golf-related information selection made by a user without the aid of a golf-related information agent or golf professional;

(d) Display means for displaying a golf-related information selection made by a user;

(e) Communication means for accessing a remotely accessible source for making inquiries concerning golf-related information;

(f) Control means connected to the information storage and retrieval means, display means, query means, input means and communication means for controlling and coordinating the operation thereof.

29. A free-standing self-contained unit for providing self-service selection and review of travel destination information and for initiating communications for making travel destination reservations in response to a plurality of input data set items provided by a user without the aid of a travel agent or travel professional, comprising:

(a) a monitor oriented in a manner that permits viewing of displayed information;

(b) an input means that permits users to input information without the aid of a travel agent or travel professional in response to queries displayed on the monitor;

(c) a microcomputer CPU and at least 4 MB of random access memory for accessing and processing information for display on the monitor;

(d) a hard drive that contains information on travel destinations that is accessible by the microcomputer;

(e) a communications link associated with the microprocessor for remotely accessing a source of information for making travel reservations; and (f) speakers for audially communicating information associated with a selected travel destination and the making of travel destination reservations.

30. The unit of claim 29 further comprising a communications link for modifying, deleting, updating or adding travel destination information from a remote location.

31. The unit of claim 29 wherein the travel destination information selected is displayed both audially and as full motion video.

* * * * *